US012731852B2

(12) United States Patent
Michaeli et al.

(10) Patent No.: US 12,731,852 B2
(45) Date of Patent: Sep. 8, 2026

(54) BATTERY PACK WITH DYNAMIC CELL SPACING

(71) Applicant: Solaredge Technologies Ltd., Herzeliya (IL)

(72) Inventors: Gadi Michaeli, Kochav Yair (IL); Bryon Roos Gomberg, Kfar Saba (IL); Ilan Yoscovich, Givatayim (IL)

(73) Assignee: Solaredge Technologies Ltd., Herzeliya (IL)

( * ) Notice: Subject to any disclaimer, the term of this patent is extended or adjusted under 35 U.S.C. 154(b) by 824 days.

(21) Appl. No.: 18/149,856

(22) Filed: Jan. 4, 2023

(65) Prior Publication Data

US 2023/0216131 A1 Jul. 6, 2023

Related U.S. Application Data

(60) Provisional application No. 63/296,630, filed on Jan. 5, 2022.

(51) Int. Cl.
*H01M 50/289* (2021.01)
*H01M 10/48* (2006.01)
(Continued)

(52) U.S. Cl.
CPC ....... *H01M 50/289* (2021.01); *H01M 10/482* (2013.01); *H01M 10/486* (2013.01);
(Continued)

(58) Field of Classification Search
None
See application file for complete search history.

(56) References Cited

U.S. PATENT DOCUMENTS

| | | |
|---|---|---|
| 7,781,097 B2 | 8/2010 | Mehta et al. |
| 8,481,191 B2 | 7/2013 | Hermann |

(Continued)

FOREIGN PATENT DOCUMENTS

| | | |
|---|---|---|
| CN | 112382823 A | 2/2021 |
| CN | 213584010 U | 6/2021 |

(Continued)

OTHER PUBLICATIONS

Jun. 13, 2024—European Examination Report—EP App. No. 23150406.9.

(Continued)

*Primary Examiner* — Jonathan Crepeau
(74) *Attorney, Agent, or Firm* — Banner & Witcoff, Ltd.

(57) ABSTRACT

Disclosed herein is an apparatus for controlling the spacing of battery cells. The apparatus monitors the temperature of the battery cells, and when a battery cell temperature value exceeds a threshold, changes the configuration of the battery cell spacing from an initial closed configuration to an open configuration using a spacer mechanism. The spacing during the closed configuration is a first distance between the battery cells, and during the open configuration is a second distance between the battery cells. The second distance is substantially large than the first distance to position the lithium ion cells further apart, lowering the probability a thermal runaway event propagating from one cell to adjacent cells. The spacer mechanism may include a telescoping or expanding frame, a motor, one or more sensors, and a controller configured to operate the mechanical spacer.

18 Claims, 8 Drawing Sheets

(51) Int. Cl.

| | |
|---|---|
| ***H01M 10/613*** | (2014.01) |
| ***H01M 10/653*** | (2014.01) |
| ***H01M 10/658*** | (2014.01) |
| ***H01M 50/204*** | (2021.01) |
| ***H01M 50/209*** | (2021.01) |
| ***H01M 50/291*** | (2021.01) |
| ***H01M 50/293*** | (2021.01) |

(52) U.S. Cl.
CPC ....... *H01M 10/653* (2015.04); *H01M 10/658* (2015.04); *H01M 50/204* (2021.01); *H01M 50/209* (2021.01); *H01M 50/291* (2021.01); *H01M 50/293* (2021.01); *H01M 10/613* (2015.04)

(56) References Cited

U.S. PATENT DOCUMENTS

| | | | | |
|---|---|---|---|---|
| 8,518,574 | B1 | 8/2013 | Kwak et al. | |
| 8,729,904 | B2 | 5/2014 | Yount | |
| 2020/0194753 | A1 * | 6/2020 | Fujiwara ............... | H01M 10/48 |

FOREIGN PATENT DOCUMENTS

| | | | | |
|---|---|---|---|---|
| CN | 113851778 | | * | 12/2021 |
| KR | 20120124613 | A | | 11/2012 |
| KR | 20150050223 | A | | 5/2015 |
| KR | 20210118529 | A | | 10/2021 |
| WO | 2014047812 | A1 | | 4/2014 |
| WO | WO 2017139826 | | * | 8/2017 |
| WO | 2019/003772 | A1 | | 1/2019 |

OTHER PUBLICATIONS

Jun. 2, 2023—European Search Report—EP App. No. 23150406.9.
"Pantograph," Wikipedia, retrieved from https://en.wikipedia.org/wiki/Pantograph , retrieved May 29, 2024.
"Scissors mechanism," Wikipedia, retrieved from https://en.wikipedia.org/wiki/Scissors_mechanism#, retrieved May 29, 2024.
"Telescopic Screw Drives M-TEG/S-TEG," NEFF Gewindetriebe, retrieved from https://www.neff-ballscrews.com/products/telescopic-screw-drives , retrieved May 29, 2024.

* cited by examiner

BATTERY PACK WITH DYNAMIC CELL SPACING

CROSS REFERENCE TO RELATED APPLICATIONS

This application claims the benefit of U.S. Provisional Application No. 63/296,630, filed on Jan. 5, 2022. The entire disclosure of the foregoing application is incorporated by reference in its entirety.

BACKGROUND

The present disclosure relates to the field of energy storage.

In lithium-ion batteries, lithium ions move from a negative electrode (anode) through an electrolyte to a positive electrode (cathode) during discharge and from the positive electrode (cathode) through the electrolyte to the negative electrode (anode) during charging. An anode material may include a material intercalated with lithium, such as a carbon based compound. The electrolyte allows lithium ion movement between the anode and cathode. A lithium ion cell is an electrochemical unit that contains the anode, cathode, separator, and electrolyte. A lithium ion battery (LIB) or battery pack is a collection of lithium ion cells. The LIB housing (e.g., a pouch or case) and electrical interconnections may be used to supply electrochemical power to a device.

For battery energy storage systems (BESSs), lithium ion cells may be arranged in battery packs. Battery packs may be located in battery racks. Battery racks or battery packs may be located indoors, such as in a network, server, and/or equipment rooms. Battery racks or battery packs may be located outdoors, such as in enclosures and/or containers.

Thermal runaway (TR) is one safety concern for lithium ion batteries (LIBs). For example, when LIBs are damaged, an internal short circuit may develop. The heat released may cause the temperature to increase locally, and a thermal runaway may start. When temperatures of the thermal runaway reach above 150 degrees Celsius (deg C), the separators inside the LIBs and external casings may fail, further increasing heat release. The thermal runaway may propagate to adjacent cells and the process repeats. Some cells may smolder upon reaching a minimum or threshold temperature value as detected by a sensor and sometime later, such as minutes or ours, these cells may reach thermal runaway conditions.

SUMMARY

The following is a short summary of some of the inventive concepts for illustrative purposes only. This summary is not an extensive overview, and is not intended to identify key or critical elements. This summary is not intended to limit or constrain the aspects and examples in the detailed description. One skilled in the art will recognize other novel combinations and features from the detailed description.

Disclosed are aspects of solutions to limit thermal runaway from propagating from one lithium ion cell to another lithium ion cell in a lithium ion battery pack. A spacer mechanism is incorporated into the battery pack that senses when one of the cells of the battery pack reaches a TR threshold temperature, and responds by increasing the spacing between the cells of the battery pack. The spacer mechanism may be operable to change from a closed configuration to an open configuration. For example, a pantograph may be used as a spacer mechanism to separate the lithium ion cells of a battery pack when one of the cells reaches a threshold temperature. For example, a telescopic screw drive may be used as a spacer mechanism to separate the lithium ion cells of a battery pack when one of the cells reaches a threshold temperature. For example, an intumescent material may be encapsulated in a heat resistant shell and used as a spacer mechanism to separate the lithium ion cells of a pack, and when one of the cells reaches a threshold temperature the neighboring e.g., adjacent) intumescent shells will begin to expand, harden, and separate the distance between the hot cell (e.g., the battery cell with increased temperature) to the neighboring (e.g., adjacent) colder cells.

The lithium ion cells may be separated together as a unit, such that the cell spacing of all cells are increased together when one of the cells reaches the threshold temperature, The lithium ion cells may be separated individually, such that the cell spacing of neighboring (e.g., adjacent) cells are increased when the central cell reaches the threshold temperature. The lithium ion cells may be separated to a different spacing, such that the cell spacing of neighboring (e.g., adjacent) cells are increased based on their distance from a central cell that has reached the threshold temperature. To create room for the increased cell spacing, a front panel of the battery pack may be hinged. The hinged front panel of the battery pack may be latched under normal operating conditions and the latch may be released when one of the cell temperatures reaches a TR threshold temperature. The cells of the battery pack may be arranged on a sliding retainer and/or frame, such as on a drawer slide, to support the cell weight when the spacing is increased. The cell spacing may be increased as a precaution to avoid thermal runaway, such as to increase airflow and cooling of the cell with when an increased temperature is detected on that cell.

Since a cell that is nearing a thermal runaway event may exhibit additional physical changes, many types of sensors may be used to monitor the cells of a battery pack to detect a possible forthcoming TR event. Cell temperature may be monitored using a temperature sensor. An acoustic sensor may be used to detect an acoustic precursor to TR and temperature increase. For example, an acoustic precursor to TR and temperature increase may be when a cell pouch vent releases pressurized gases, resulting in an identifiable sound. A gas sensor may be used to detect the presence of a gas generated prior to and/or during, a TR event. A pressure sensor may be used to detect an increased pressure inside the cell. A strain gauge may be used to detect an increased pressure inside the cell. For example, the strain gauge may detect a change in strain of the cell enclosure or cover. A voltage sensor or an impedance sensor may be used to detect electrical changes of a cell that may occur prior to a TR event.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures. In the drawings, like numerals reference similar elements.

DETAILED DESCRIPTION

Figure 1:
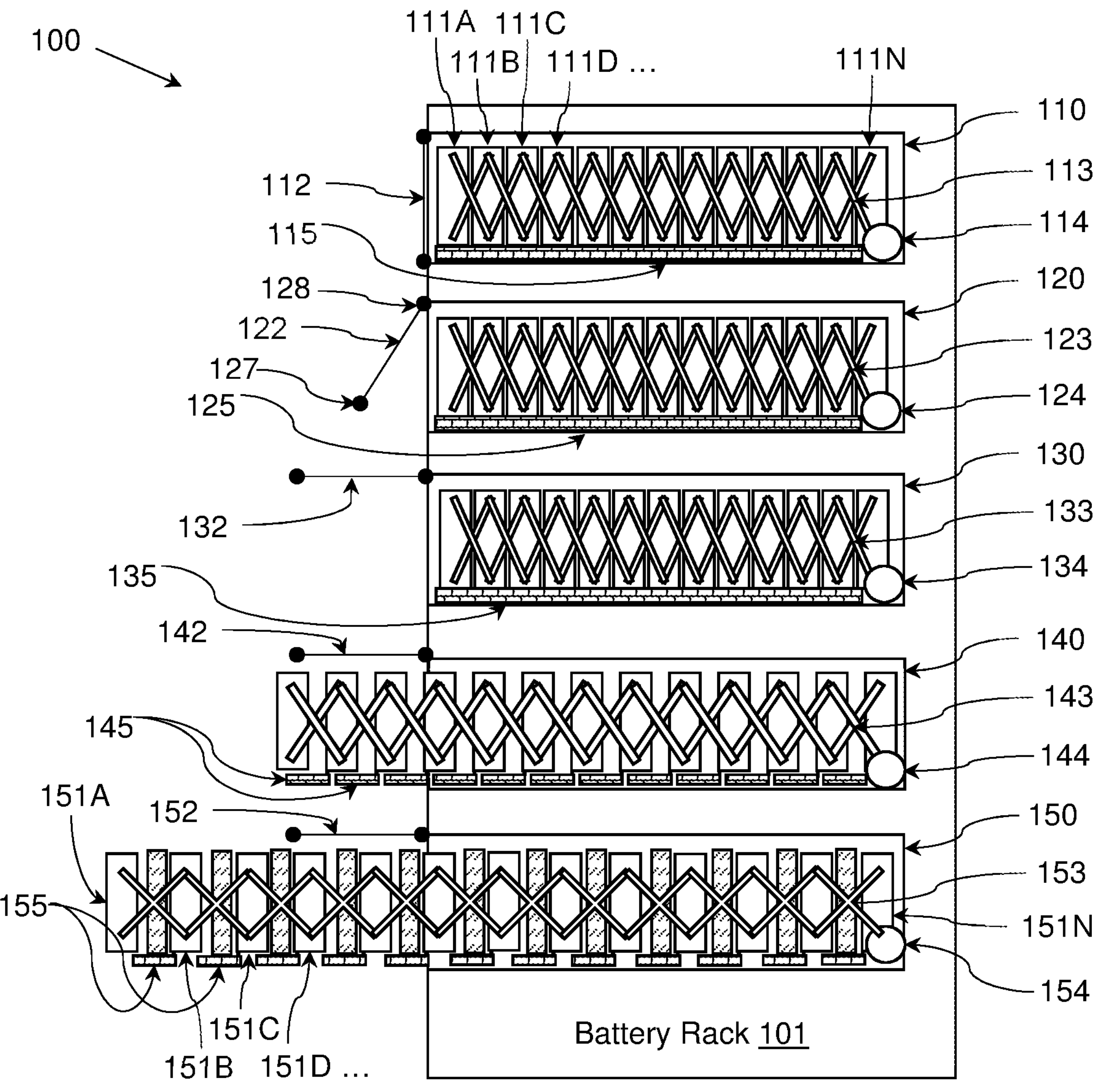
FIG. 1 shows, schematically, an example device for increasing cell spacing in a battery pack using a pantograph as a spacer mechanism.

The accompanying drawings, which form a part hereof, show examples of the disclosure. It is to be understood that the examples shown in the drawings and/or discussed herein are non-exclusive and that there are other examples of how the disclosure may be practiced. Where applicable, like numbers indicate like components.

Reference is now made to FIG. 1, which shows, schematically, an example device 100 for increasing cell spacing in a battery pack using a pantograph 113, 123, 133, 143, 153 as a spacer mechanism. The device may comprise a battery rack 101 of battery packs 110, 120, 130, 140, 150. Each battery pack includes one or more battery cells. For example, battery pack 110 may include battery cells 111A, 111B, 111C, 111D, . . . 111N. N may be any appropriate whole number. The battery cells may be pouch type battery cells or prismatic cells. Battery packs 120, 130, 140, 150 may similarly include one or more battery cells (not referenced for brevity). Battery packs 110, 120, 130, 140, 150 of device 100 may have a plurality of configurations during operation. Each battery pack 110, 120, 130, 140, 150 pack comprises a different configuration.

Battery pack 110 shows a first configuration (such as a spacer mechanism in a closed configuration) where a pantograph 113 and a front panel 112 are in a closed configuration. In such a configuration, battery cells 111A-111N may be operating at a normal temperature, such as having a temperature value (as sensed by a temperature sensor) less than a first threshold temperature. An apparatus 114 may monitor the temperatures of battery cells 111A-111N. Apparatus 114, 124, 134, 144, 154 may each comprise one or more controllers, motors, actuators, and/or sensors. Sensors may include at least one of: temperature sensors, voltage sensors, pressure sensors, strain gauges, acoustic sensors, and/or gas sensors. For brevity, temperature thresholds, temperature sensors, and/or temperature monitoring are some example measurements, but one skilled in the art would understand that other kinds of measurements may be used. A series of extending heat barriers 115 may be placed below and/or above the battery cells 111A-111N, where each barrier may be configured to extend when the spacing between each adjacent pair of battery cells reaches a distance large enough to accommodate the width of each barrier.

Battery pack 120 shows a second configuration (such as a spacer mechanism in a closed configuration with a partially open front panel) where a front panel 122 is released from a closed configuration and a pantograph 123 remains in a closed configuration. Front panel 122 may be released by a controller of apparatus 124 in response to a sensor reporting a temperature value of one or more battery cells being above a first threshold. Front panel 122 may be released by freeing a latch to release the front panel 122. For example, latches 407 and/or 507 of FIG. 4 or 5, respectively, may be used to release the front panel 122. For example, a first threshold temperature may be set to a first threshold temperature value between 60 degrees Celsius (deg C) and 120 deg C. Front panel 122 is shown with a hinge 128 on the upper edge of the front panel 122, but the hinge 128 may be alternatively located on the lower edge 127 of front panel 122. Pantograph 123 remains in a closed configuration. A series of heat barriers 125 may be placed below and/or above the battery cells, as in battery pack 120.

Battery pack 130 shows a third configuration (such as a spacer mechanism in a closed configuration with a fully open front panel) where a front panel 132 is fully open, and ready to extend pantograph 133. A controller of apparatus 134 may continue to monitor battery cell temperatures using one or more temperature sensors of apparatus 134. For example, the controller may receive temperature data related to the battery cell temperatures from one or more sensors of apparatus 134. In some cases, opening the front panel 132 may produce air circulation within the battery pack 130 to reduce cell temperatures, and a thermal runaway may be delayed or avoided. A series of heat barriers 135 may be placed below and/or above the battery cells, as in battery pack 120.

Battery pack 140 shows a fourth configuration (such as a spacer mechanism in a partially open configuration) where a pantograph 143 is partially opened and extending out of an open front panel 142, increasing spacing between battery cells. When a controller of apparatus 144 receives a battery cell temperature value (such as from a temperature sensor) increasing above a second threshold temperature, such as a second threshold temperature value between 80 deg C and 200 deg C, the pantograph 143 may be extended by the controller of apparatus 144. For example, the controller may detect the battery cell temperature using one or more sensors of apparatus 144. For example, the controller may extend the pantograph 143 using the motor of apparatus 144. For example, the motor rotates an end of the pantograph 143, causing the pantograph 143 to extend. The second threshold temperature may be greater than the first threshold temperature. A series of heat barriers 145 may be placed below and/or above the battery cells, and the heat barriers 145 are spaced between each pair of battery cells as the pantograph 143 extends.

Battery pack 150 shows in a fifth configuration (such as spacer mechanism in an open configuration) where a pantograph 153 is fully extended through a front panel 152. Controller of apparatus 154 may stop the operation of the motor of apparatus 154 once pantograph 153 is fully extended. Battery cells 151A, 151B, 151C, 151D, . . . 151N are separated with sufficient distance between adjacent battery cells for heat barriers 155 to extend between each pair of battery cells. Heat barriers 155 may include a heat conducting layer to remove heat from the battery cells. Heat barriers 155 may include an insulating layer to provide thermal insulation between battery cells. Insulating layers of heat barriers 155 may provide a steeper temperature gradient between battery cells, thus lowering the chance of thermal runaway from propagating from one battery cell to another.

Figure 2:
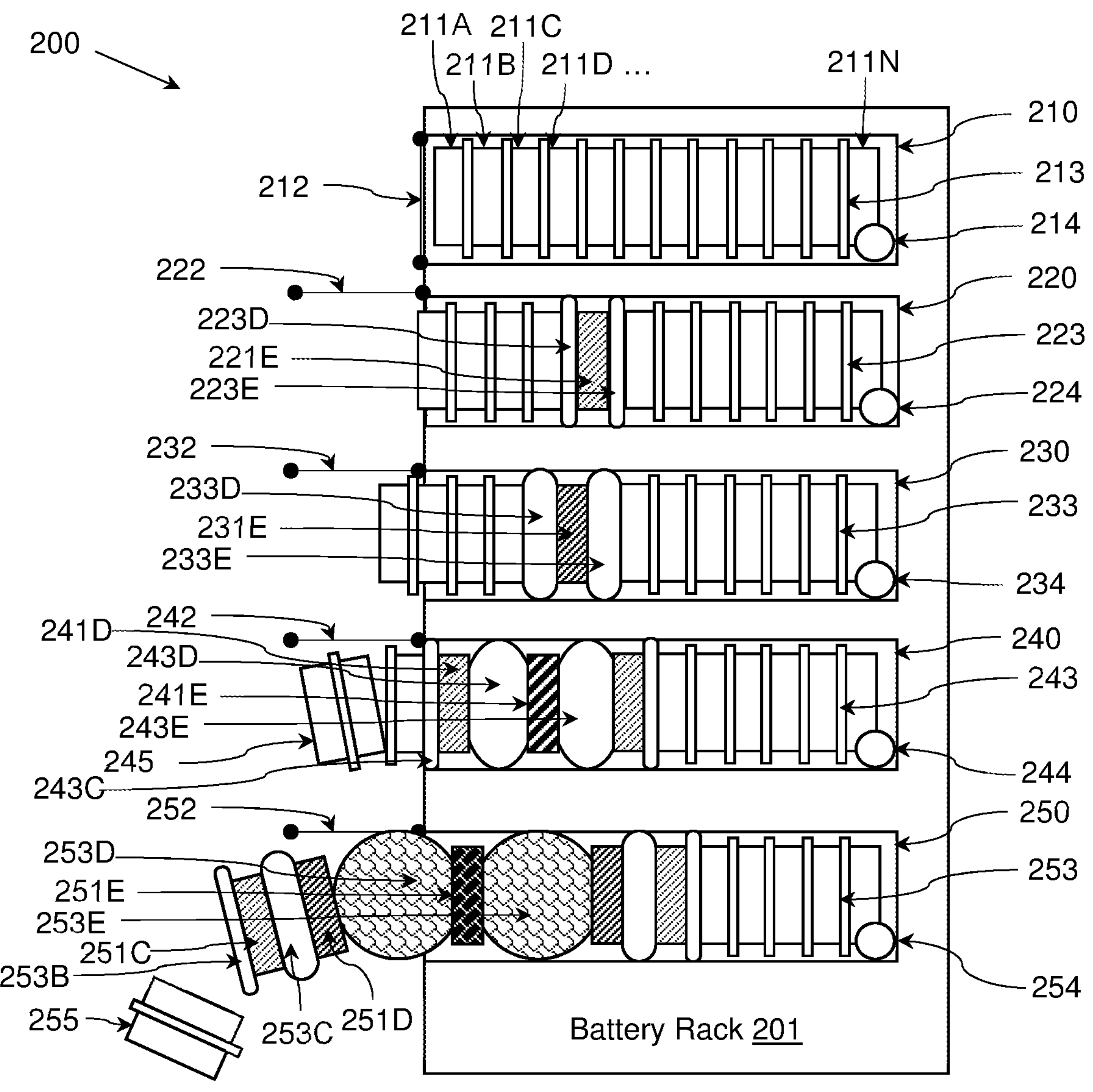
FIG. 2 shows, schematically, an example device for increasing cell spacing in a battery pack using an intumescent material inside shells as a spacer mechanism.

Reference is now made to FIG. 2, which shows, schematically, an example device 200 for increasing battery cell spacing in battery packs 210, 220, 230, 240, 250 using intumescent material shells 213, 223, 233, 243, 253 as a spacer mechanism. Intumescent material shells 213, 223, 233, 243, 253 may be made at least in part of an intumescent material. Intumescent material shells 213, 223, 233, 243, 253 may be configured or operable in a closed configuration, such as before heating of the intumescent material. Intumescent material shells 213, 223, 233, 243, 253 may be configured or operable in an open configuration, such as after heating of the intumescent material. For example, a battery rack 201 may contain battery packs 210, 220, 230, 240, 250, shown at advancing stages, using intumescent material shells 213, 223, 233, 243, 253. Apparatus 214, 224, 234, 244, 254 may each comprise one or more controllers, and/or sensors. For example, in battery pack 210 intumescent material shells 213 are placed between each pair of battery cells 211A, 211B, 211C, 211D, . . . 211N. One intumescent material shell 213 is referenced for the purposes of an example from among all intumescent material shells between cells 211A, 211B, 211C, 211D, . . . 211N. Battery pack 210 is in a normal operating condition where battery cell temperatures (such as temperature values received from temperature sensors) have not increased above a first threshold temperature, such as a first threshold temperature value between 60 deg C and 120 deg C. Front panel 212 may be closed. Front panel 212 may be latched to prevent accidental opening of the battery pack during handling or maintenance. For example, latches 407 and/or 507 of FIG. 4 or 5, respectively, may be used to release the front panel 212. A controller of apparatus 214 may be configured to monitor temperatures of battery cells 211A-211N. For example, the controller of apparatus 214 may monitor data from one or more sensors of apparatus 214. As used herein, the meaning that a temperature is increased above a threshold means that a controller is configured to monitor temperature values from temperature sensor associated with a cell, the temperature values are compared to the threshold value, and when one of the values increases above the threshold the condition is met. The values may be floating point values representing temperature in Centigrade, and/or a sensor value used by a function to produce a temperature value. For brevity, the explicit references to values and sensors may be omitted, but it may be implied that these techniques of monitoring temperatures using an appropriately configured controller and sensors may be used throughout the examples of this disclosure.

Battery pack 220 shows a battery cell 221E reaching a temperature value above the first threshold temperature. For example, a controller of pack 220 may be configured to monitor the battery cell temperatures using a temperature sensor. For example, the controller of pack 220 may be configured to send a notification when a battery cell temperature value increases above the first threshold temperature. As used herein, the term notification means performing an action that communicates that at least one battery cell of a device disclosed herein has exceeded a threshold temperature. For example, a notification may be a warning, an alarm, a message, a digital message, an activation message, a signal, a visible indication, an audible indication, a trigger mechanism, an alert message, and/or a message containing a command. For example, a notification is sent to an operator of the device using a graphical user interface (GUI). For example, a warning and/or alarm is sent to a graphical user interface and/or a server. For example, a notification is sent to a server in charge of monitoring the device, and the server initiates actions such as displaying a status update on a GUI, initiating a fire extinguishing system, and/or sending a notification to a second monitoring system (e.g., a fire department system). For example, a communication circuit controlled by the controller may be used to send a notification. For example, the communication circuit may be configured to communicate with a server. For example, the communication circuit may be configured to communicate with a communication protocol.

The controller of pack 220 may be configured to open a latch of front panel 222. For example, latches 407 and/or 507 of FIG. 4 or 5, respectively, may be used to release the front panel 222. Front panel 222 may be closed with a spring loaded mechanism. When the latch is released, the front panel 222 may open due to the force of the loaded spring. The controller of pack 220 may open the front panel 222 using a motor and/or actuator of apparatus 224. Intumescent material shells 223D, 223E may begin to expand due to the increased temperature of adjacent battery cell 221E. For example, intumescent material shells 213, 223, 233, 243, 253 may be configured to be heat resistant up to a relatively high temperature, such as temperatures between 300 and 600 deg C. For example, intumescent material shells 213, 223, 233, 243, 253 may encapsulate an intumescent material comprising a gas producing material and a carbon-based material, where the intumescent material may be configured to convert to a foam material (e.g., release gasses and begin carbonization) at a temperature between 120 and 200 deg C. When the temperature of the intumescent material shell increases above the first threshold temperature, the gas producing material may begin to produce gases to convert the carbon-based material to a foam material and/or a cellular structure. The produced gas may cause the intumescent material shells 223D, 223E to expand and increase the spacing between the battery cell 221E with increased temperature (also referred to as "the hot cell") and the neighboring (e.g., adjacent) battery cells. As the temperature increases, more gas is produced to further increase the spacing and convert the intumescent material to a carbonized foam material.

Intumescent material shells 213, 223, 233, 243, 253 may include a heat resistant flexible shell and an intumescent material inside the shell. FIG. 2 shows intumescent material shells 213, 223, 233, 243, 253 at different temperatures where, as temperatures increase, the size of the intumescent material shell may increase. For example, the sizes of the intumescent material shells 213, 223, 233, 243, 253 may correspond to temperatures that the intumescent material shells have reached. The intumescent material may be granulated to allow expansion of the shell causing separation of the battery cells. As the intumescent material shell is heated from the relatively high temperature of an adjacent battery cell, the intumescent material expands and pushes against the neighboring (e.g., adjacent) battery cells, thereby increasing the distance separating the relatively high-temperature battery cell from the relatively lower-temperature neighboring (e.g., adjacent) battery cells. Intumescent materials may be formed from various materials comprising a gas and/or vapor producing material, and/or a carbon based material that, when heated, produces an insulating char. For example, intumescent material shells 213, 223, 233, 243, 253 may comprise a fluorinated ethylene propylene film, a polyimide resin film, a polyimide film, a polyolefin film, a polyester film, a polyethylene terephthalate film, a heat resistant fabric, a fiberglass cloth, an alumina cloth, a silica cloth, a silicon-fiberglass cloth, a metal fabric (such as aluminum), a metal foil (such as aluminum), and/or the like. For example, the gas producing material may comprise hydrates that produce a water vapor as a gas. For example, an intumescent material may comprise ammonium polyphosphate, pentaerythritol, and/or melamine. For example, an intumescent material may comprise vinyl acetate copolymers and/or styrene acrylates as binders. For example, an intumescent material may comprise sodium silicate. For example, an intumescent material may comprise melamine-formaldehyde resin. For example, an intumescent material may comprise intumescent fire seals. For example, an intumescent material may comprise graphite. For example, an intumescent material may comprise vermiculite.

Battery pack 230 shows a battery cell 231E with a further increased temperature, and shells 233D, 233E reaching a maximum height limit due to gas buildup and limited height of the battery pack 230 interior. A controller of apparatus 234 may be configured to continue monitoring the cell temperatures using one or more temperature sensors of apparatus 234. Front panel 232 is in an open configuration. Battery pack 240 shows a battery cell 241E nearing a critical temperature, and intumescent material shells 243D, 243E beginning to push battery cells 245 that are located closest to front panel 242 out of the battery pack 240. Neighboring (e.g., adjacent) battery cells such as battery cell 241D to battery cell 241E may increase in temperature, and may cause intumescent material shell 243C to begin producing gasses that convert the carbon-based material within intumescent material shell 243C to a foam material. A controller of apparatus 244 may monitor battery cell temperatures using one or more temperature sensors of apparatus 234 and send a notification, such as to an operator, when the temperature value of the hottest battery cell exceeds a second threshold temperature, such as a second threshold temperature value between 80 deg C and 200 deg C. Battery pack 250 shows battery cell 251E nearing a very high temperature and intumescent material shells 243D, 243E nearing their maximum size. This may be the maximum separation between battery cells 241E and neighboring (e.g., adjacent) battery cells, such as battery cell 241D. Neighboring (e.g., adjacent) battery cells, such as battery cell 241D, may increase in temperature which may result in intumescent material shell 253C also increasing spacing to the next neighboring (e.g., adjacent) battery cells 251C and 251D. Intumescent material shell 253B may also show the beginning of an expansion. Battery cells 255 at the end of the battery pack may detach from the neighboring (e.g., adjacent) intumescent material shell 253B and leave pack 250 from front panel 252. A controller of apparatus 254 may monitor battery cell temperatures using one or more temperature sensors of apparatus 254 and send a notification, such as to an operator, when the temperature value of the hottest battery cell exceeds a second threshold temperature, such a second threshold temperature value between 80 deg C and 200 deg C.

Figure 3:
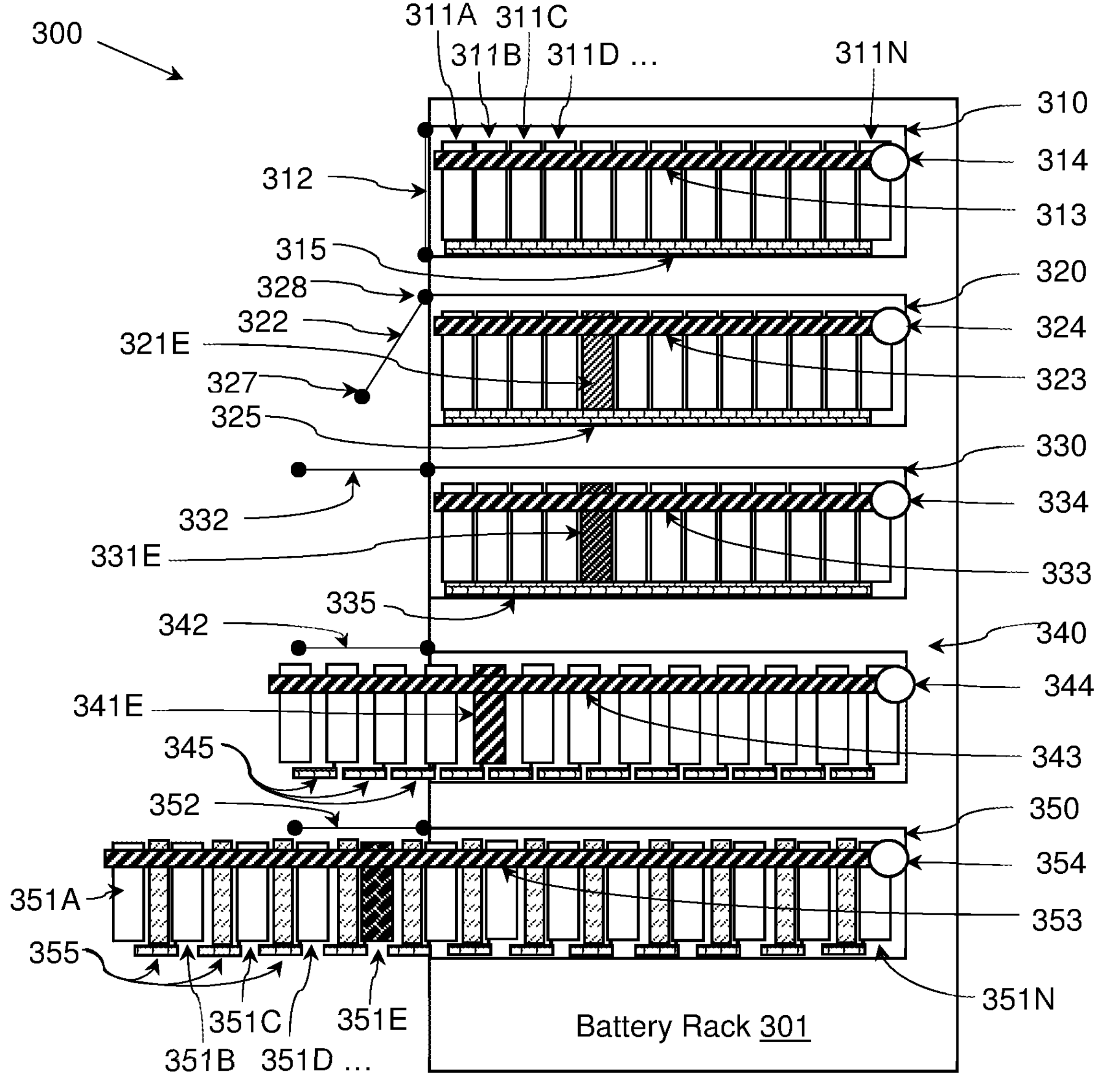
FIG. 3 shows, schematically, an example device for increasing cell spacing in a battery pack using a telescopic screw drive as a spacer mechanism.

Reference is now made to FIG. 3, which shows, schematically, an example device 300 for increasing battery cell spacing in battery packs 310, 320, 330, 340, and/or 350 using telescopic screw drives 313, 323, 333, 343, 353, as spacer mechanisms. The device 300 may comprise a battery rack 301 of battery packs 310, 320, 330, 340, 350. Each battery pack includes battery cells, such as battery pack 310 including battery cells (e.g., pouches) 311A, 311B. 311C, 311D, . . . 311N. Battery packs 320, 330, 340, 350 may similarly include one or more the battery cells (not referenced for brevity). Each battery pack 310, 320, 330, 340, 350 shows a different configuration and/or different aspects. Apparatus 314, 324, 334, 344, 354 may each comprise one or more controllers, motors, actuators, and/or sensors.

Battery pack 310 shows a first configuration (such as a spacer mechanism in a closed configuration) where a telescopic screw drive 313 and a front panel 312 are in a closed configuration, such as when the battery cells 311A-311N are operating at normal operating temperatures. A controller of apparatus 314 may monitor the temperature of battery cells 311A-311N. For example, a controller may receive temperature data related to the battery cell temperatures from one or more sensors of apparatus 314. A series of heat barriers 315 may be placed below and/or above the battery cells 311A-311N, where each heat barrier may be configured to extend when the spacing between each adjacent pair of battery cells reaches a distance large enough to accommodate the width of each heat barrier.

Battery pack 320 shows a second configuration (such as a spacer mechanism in a closed configuration with a partially open front panel) where a front panel 322 is released and telescopic screw drive 323 remains in a closed configuration. Front panel 322 may be released by a controller of apparatus 324 in response to a sensor of apparatus 324 sensing a temperature value indicating a temperature of one or more battery cells 321E being above a first threshold. Front panel 322 may be released by a latch releasing the front panel 322. For example, latches 407 and/or 507 of FIG. 4 or 5, respectively, may be used to release the front panel 322. The first threshold temperature may be set to a temperature value corresponding between 60 deg C and 120 deg C. The term corresponding means that the value is one representing the temperature of the cell and the actual values may be dependant on the controller and configuration used. Front panel 322 is shown with a hinge 328 on the upper edge of the front panel 322, but the hinge 328 may be alternatively located on the lower edge 327 of the front panel 322. Telescopic screw drive 323 remains in a closed configuration. A series of extending heat barriers 325 may be placed below and/or above the battery cells, as in battery pack 320.

Battery pack 330 shows a third configuration (such as a spacer mechanism in a closed configuration with a fully open front panel) where a front panel 332 is fully open and ready to extend telescopic screw drive 333. A controller of apparatus 334 may continue to monitor battery cell temperatures including cell 331E using one or more sensors of apparatus 334. In some cases opening the front panel 332 may produce air circulation within the battery pack 330 to reduce battery cell temperatures, and a thermal runaway may be delayed and/or avoided. A series of heat barriers 335 may be placed below and/or above the battery cells, as in battery pack 320.

Battery pack 340 shows a fourth configuration (such as a spacer mechanism in a partially open configuration) where the telescopic screw drive 343 is partially opened and extending out of open front panel 342, increasing spacing between battery cells. When the controller of apparatus 344 detects a battery cell 341E temperature value increasing above a second threshold temperature, such as a second threshold temperature value between 80 deg C and 200 deg C, the telescopic screw drive spacer mechanism may be extended using the controller. For example, the controller of apparatus 344 may detect the battery cell temperature using one or more sensors of apparatus 344. For example, the controller of apparatus 144 may extend the telescopic screw drive spacer mechanism using a motor of apparatus 344. For example, the motor of apparatus 344 rotates an end of the telescopic screw drive 343, causing the telescopic screw drive 343 to extend. A cable or link chain may be used between the battery cells to extend the cells when the telescopic screw drive 343 extends. A series of heat barriers 345 may be placed below and/or above the battery cells. The heat barriers 345 may be spaced between each pair of battery cells as the telescopic screw drive 343 extends.

Battery pack 350 shows a fifth configuration (such as a spacer mechanism in an open configuration) where the telescopic screw drive 353 is fully extended through front panel 352. A controller of apparatus 354 may stop operation of the motor of apparatus 354 once telescopic screw drive 353 is fully extended. A filament, cable or link chain may be used between the battery cells to extend the cells when the telescopic screw drive 353 is fully extended. For example, the filament, cable or link chain may be a metal material, polymer, ceramic, or a combination thereof. Battery cells 351A, 351B, 351C, 351D, 351E, . . . 351N are separated with sufficient distance between adjacent battery cells for heat barriers 355 to extend between each pair of battery cells. Heat barriers 355 may include a heat conducting layer to remove heat from battery cells. Heat barriers 355 may include an insulating layer to provide thermal insulation between battery cells. Heat barriers 355 may have anisotropic thermal conductivity. Insulating layers of heat barriers 355 may provide a steeper temperature gradient between battery cells, thus lowering the chance of thermal runaway from propagating from one battery cell, such as cell 351E, to another.

Figure 4:
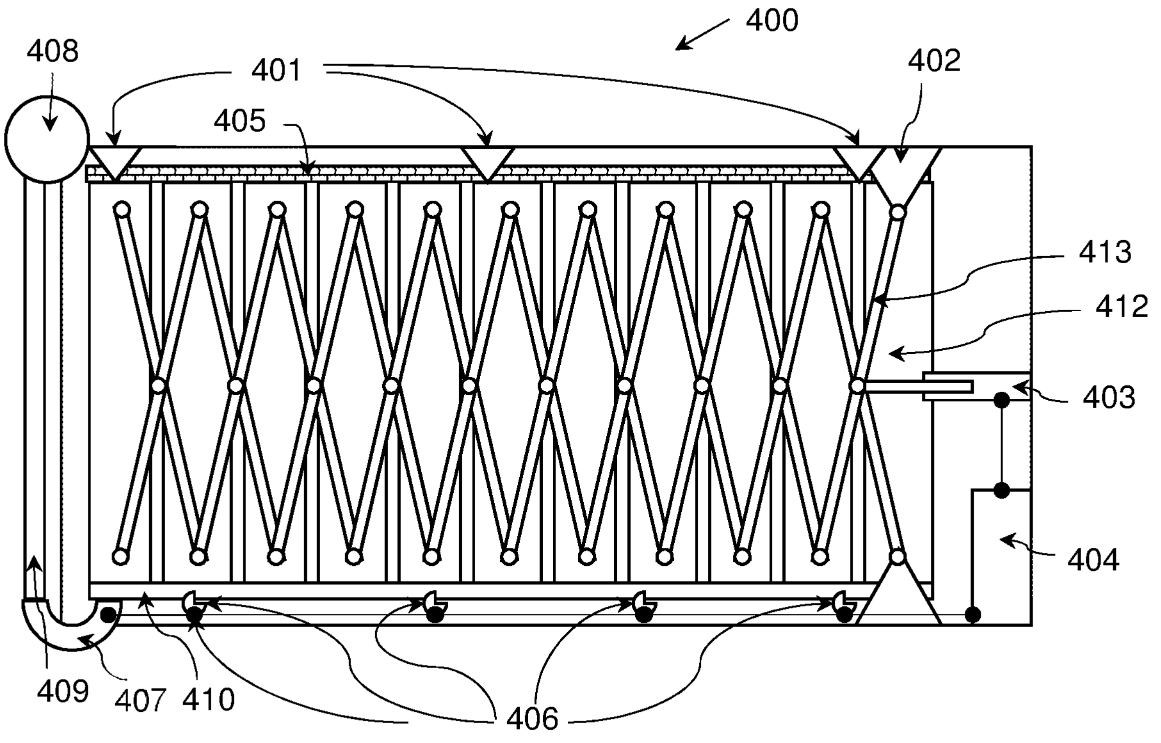
FIG. 4 shows, schematically, an example pantograph spacer mechanism for increasing cell spacing in a battery pack.

Reference is now made to FIG. 4, which shows, schematically, an example pantograph 413 as a spacer mechanism for increasing battery cell spacing in a battery pack 400. Battery cells 412 are spaced according to the configuration (such as a spacer mechanism in a closed configuration) of pantograph 413. Battery cells 412 are supported on top of the cells by a sliding mechanism 410. Sliding mechanism 410 may be a top supporting mechanism, a bottom supporting mechanism, or both a top and bottom supporting mechanism. Pantograph anchors 401 may secure top and bottom edges of pantograph 413. Pantograph anchors 402 may be used to open the pantograph 413. Linear actuator 403 may be operated to change the pantograph 413 from a closed configuration (as shown here) to an open configuration (as shown at battery pack 150 in FIG. 1). A controller of apparatus 404 may be connected to temperature sensors 406, front panel latch 407, and linear actuator 403. A controller of apparatus 404 may be configured to monitor the temperature of the battery cells 412, using one or more temperature sensors 406. When the temperature value of one of battery cells 412 reaches a first threshold temperature, the controller of apparatus 404 may open the front panel latch 407, allowing the front panel 409 to pivot on hinge 408. Hinge 408 may be a spring loaded hinge. Front panel 409 may open automatically (e.g., due to the force of the loaded spring). When front panel latch 407 is opened, front panel 409 may be moved, and pantograph 413 may be opened. The controller of apparatus 404 may operate linear actuator 403 when one or more temperature sensors 406 indicate that the temperature value of one of battery cells 412 has reached a second threshold temperature. A series of heat barriers 405 may be located above the battery cells 412, where one heat barrier 405 is located between each adjacent pair of battery cells 412. As the battery cell spacing increases, each heat barrier 405 remains attached to one of the battery cells 412. Heat barriers 405 may be configured to extend when the spacing between the battery cells 412 reaches a distance large enough to accommodate the width of each barrier 405.

Figure 5:
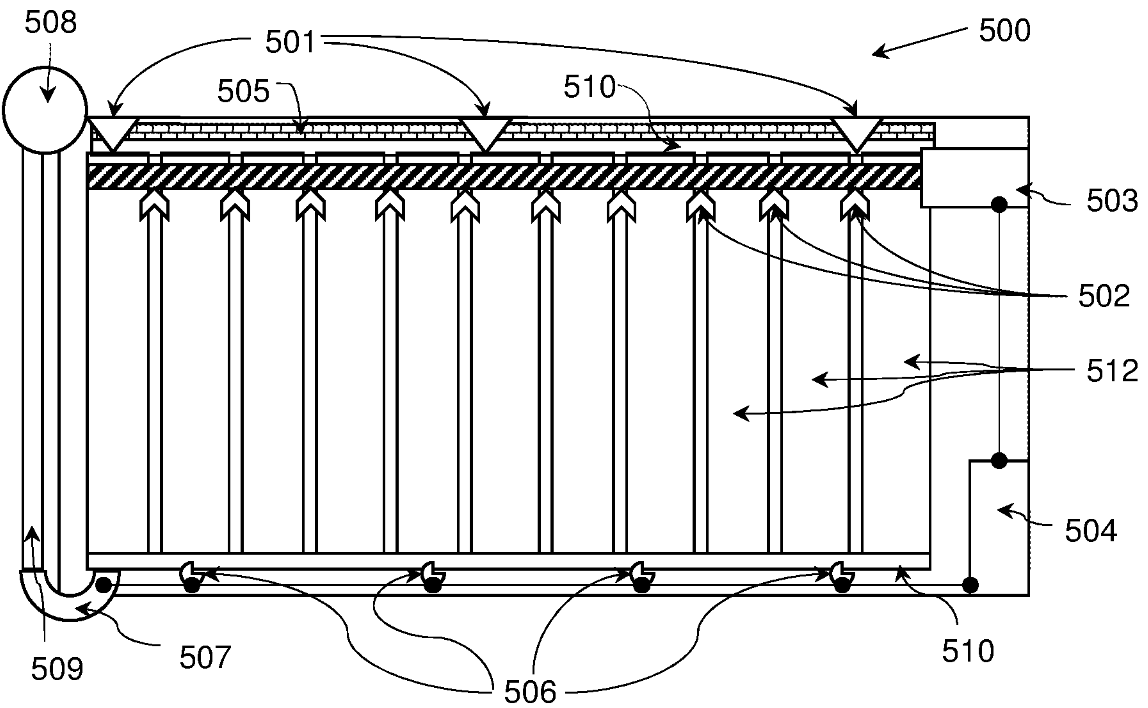
FIG. 5 shows, schematically, an example telescopic screw drive spacer mechanism for increasing cell spacing in a battery pack.

Reference is now made to FIG. 5, which shows, schematically, an example telescopic screw drive 503 as a spacer mechanism for increasing battery cell spacing in a battery pack 500. Battery cells 512 are spaced and supported by sliding mechanism 510 on top and/or bottom of the battery cells, as in FIG. 4. For example, battery cells 512 may be spaced and supported on the top with anchors 501. For example, battery cells 512, with a spacer mechanism shown in a closed configuration, may be spaced and supported on the bottom with anchors 501 and sliding mechanism 510. Sliding mechanism 510 may be a top supporting mechanism, a bottom supporting mechanism, or both a top and bottom supporting mechanism. Telescopic screw drive 503 may be operated to change spacing between battery cells (as shown at battery pack 340 and battery pack 350 in FIG. 3). For example, telescopic screw drive 503 may be attached to the first battery cell and/or the last battery cell in series within the pack, with a series of springs and/or tie cables 502 between battery cells. When telescopic screw drive 503 opens, the springs and/or tie cables 502 between battery cells cause the battery cells 512 to increase spacing. For example, the springs will push the battery cells 512 apart as the telescopic screw drive 503 increases the distance between the first battery cell 512 and last battery cell 512 in the battery pack 500.

The controller 504 may be connected to temperature sensors 506, front panel latch 507, and telescopic screw drive 503. The controller 504 may be configured to monitor the temperature of the battery cells 512, using temperature sensors 506. When the temperature value of one of the battery cells 512 reaches a first threshold temperature, controller 504 may open the front panel latch 507, allowing the front panel 509 to pivot on hinge 508. Hinge 508 may be a spring loaded hinge and open automatically (e.g., due to the force of the loaded spring). When front panel latch 507 is opened, front panel 509 may be moved when telescopic screw drive 503 opens. The controller 504 may operate telescopic screw drive 503 when one or more temperature sensors 506 indicate that the temperature value of one of the battery cells 512 has reached a second threshold temperature. Telescopic screw drive 503 may be operated using controller 504 to change from a closed configuration (e.g., as shown here) to an open configuration (e.g., as shown at battery pack 350 in FIG. 3). A series of heat barriers 505 may be located above the battery cells 512, where one heat barrier 505 is located between each adjacent pair of battery cells 512. As the battery cell spacing increases, each heat barrier 505 remains attached to one of the battery cells 512. Heat barriers 505 may be configured to extend when the spacing between the battery cells reaches a distance large enough to accommodate the width of each barrier 505.

Figure 6:
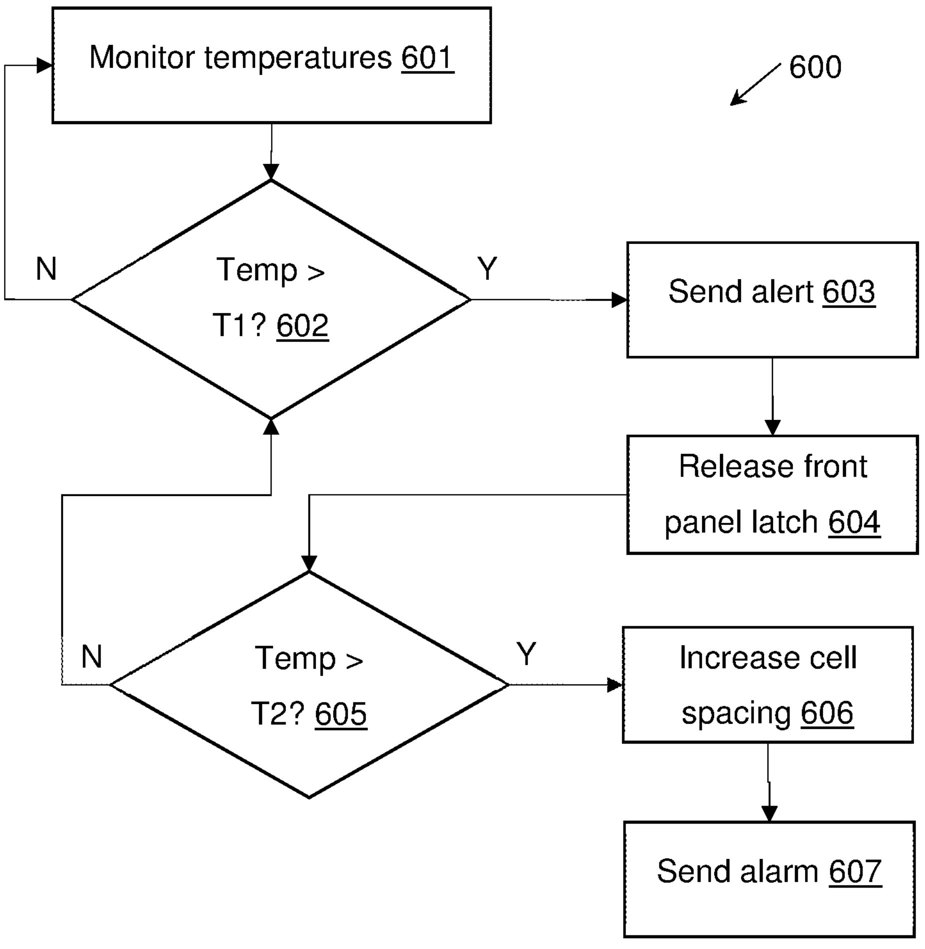
FIG. 6 shows a flowchart of an example method for increasing cell spacing in a battery pack.

Reference is now made to FIG. 6, which shows a flowchart 600 of an example method for increasing battery cell spacing in a battery pack. At step 601, a controller (e.g., controllers of apparatuses 114, 124, 134, 144, 154, 214, 224, 234, 244, 254, 314, 324, 334, 344, and/or 354, controller 404, controller 504) may monitor battery cell temperatures (e.g., using one or more temperature sensors as described herein). At step 602, the controller may determine that the temperature value of one of the monitored battery cells (as disclosed herein) has increased above a first threshold temperature T1. At step 603, the controller may send a notification or alert. At step 604, the controller may release a front panel latch (as disclosed herein) to allow a front panel to open due to a force acting on the front panel. For example, a spring mechanism may include a force from the front battery cell (or a support of the front battery cell), a force from the sliding mechanism, a force from the pantograph, and/or a force from a telescopic screw drive. At step 605, the controller may determine that the temperature value of one of the monitored battery cells has increased above a second threshold temperature T2. At step 606, the controller may initiate an increase in battery cell spacing. For example, controller may cause a linear actuator or a motor to operate a pantograph. For example, controller may operate a telescopic screw drive spacer mechanism. In turn, at step 607, a second notification may be sent, such as to an operator.

In FIGS. 4, 5, and 6, temperature thresholds, temperature measurements, temperature monitoring, and/or temperature sensors are some example measurements, but one skilled in the art would understand that other kinds of measurements using voltage sensors, pressure sensors, strain gauges, acoustic sensors, and/or gas sensors may be taken with appropriate adjustments to threshold values. For example, thermal runaway may be detected when specific gases leak from the cell into the battery pack and are detected using a gas sensor. For example, strain gauges attached to the battery cell pouches may be used to detect an impeding thermal runaway.

Figure 7A:
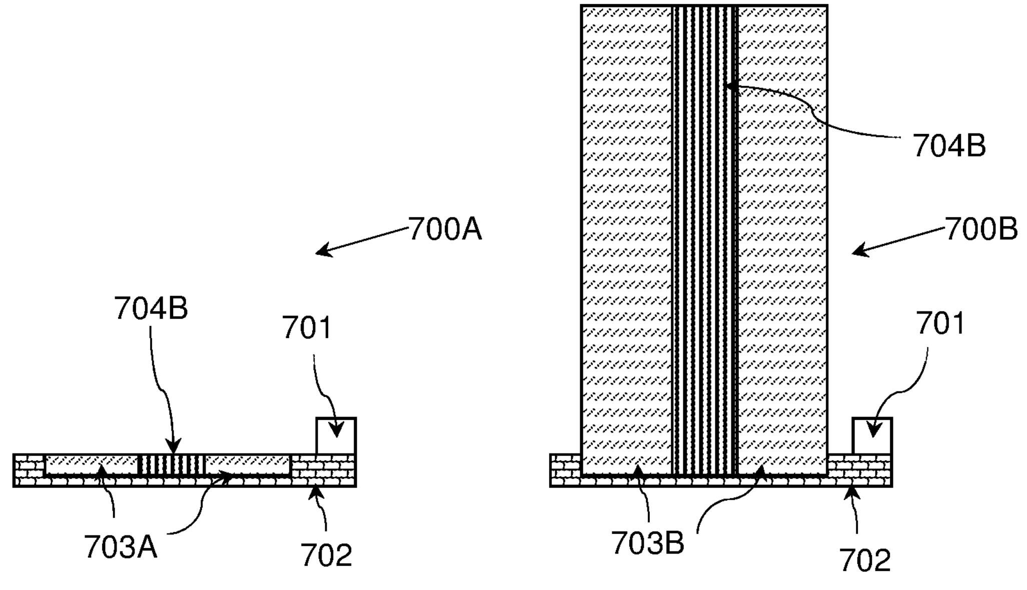
FIG. 7A shows, schematically, an example upward extendable heat barrier for deployment between cells with increased spacing.

Reference is now made to FIG. 7A, which shows, schematically, an example upward extendable heat barrier 700A, 700B for deployment between battery cells with increased spacing. Heat barrier 700A, 700B may be heat barrier 115, 125, 135, 145, 155, 315, 324, 335, 345, 355, 405, 505. Heat barrier 700A is illustrated in a closed configuration. Heat barrier 700B is illustrated in an extended configuration. Heat barriers 700A, 700B may include a cell attachment mechanism 701 connected to a frame 702. Frame 702 may position an extending barrier in a closed configuration 703A or in an extended configuration 703B, such that when the cell spacing is increased, the extending barrier 703A will extend. Extending barriers 703A, 703B may comprise a heat insulating layer. Frame 702 may position an extending barrier in a closed configuration 704B or in an extended configuration 704B, such that when the cell spacing is increased, the extending barrier 704B will extend. Extending barriers 703A, 704B may comprise a heat insulating layer. The heat insulating layer may be a heat insulating cloth or fabric surrounding a mechanical structure that extends, such as a spring or a shape memory material. A shape memory material may be a shape memory polymer or alloy (such as Nitinol).

Figure 7B:
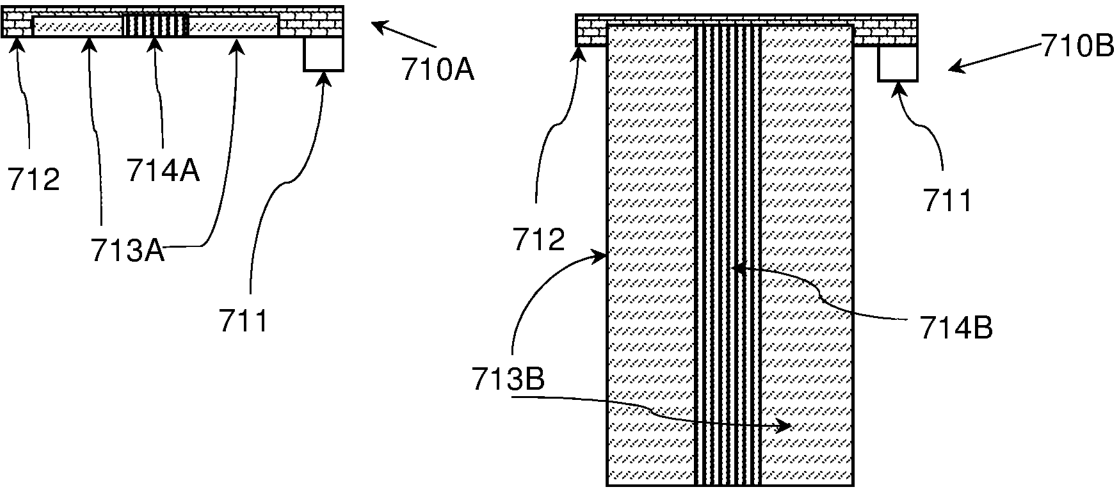
FIG. 7B shows, schematically, an example downward extendable heat barrier for deployment between cells with increased spacing.

Reference is now made to FIG. 7B, which shows, schematically, an example downward extendable heat barrier 710A, 710B for deployment between battery cells with increased spacing. Heat barrier 710A, 710B may be heat barrier 115, 125, 135, 145, 155, 315, 324, 335, 345, 355, 405, 505. Heat barrier 710A is illustrated in a closed configuration. Heat barrier 710B is illustrated in an extended configuration. Heat barriers 710A, 710B may include a cell attachment mechanism 711 connected to a frame 712. Frame 712 may position an extending barrier in a closed configuration 713A or in an extended configuration 713B, such that when the cell spacing is increased, the extending barrier 703A will extend. Extending barriers 713A, 713B may comprise a heat insulating layer. Frame 712 may position an extending barrier in a closed configuration 714A or in an extended configuration 714B, such that when the cell spacing is increased, the extending barrier 714A will extend. Extending barriers 714A, 714B may comprise a heat insulating layer.

Figure 7C:
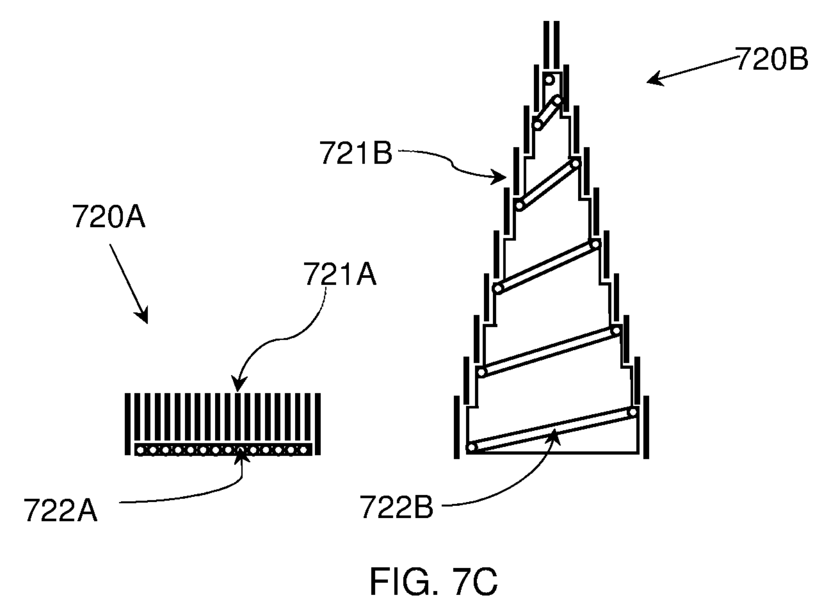
FIG. 7C shows, schematically, an example telescoping heat barrier for deployment between cells with increased spacing.

Reference is now made to FIG. 7C, which shows, schematically, an example telescoping barrier 720A, 720B for deployment between battery cells with increased spacing. Heat barrier 720A, 720B may be used as heat barrier 115, 125, 135, 145, 155, 315, 324, 335, 345, 355, 405, 505, 700A, 700B, 710A, and/or 710B. Telescoping barriers 720A, 720B may be used as an extending barrier in a closed configuration 703A or in an upward extended configuration 703B, respectively. Telescoping barriers 720A, 720B may be used as an extending barrier in a closed configuration 713A or in a downward extended configuration 713B, respectively. Telescoping barrier 720A is illustrated in a closed configuration. Telescoping barrier 720B is illustrated in an extended configuration. Telescoping barrier 720A, 720B may include a wire cross-section volute spring, such as at 722A (in a closed configuration) or at 722B (in an extended configuration). Surrounding spring 722A, 722B is a telescoping stack of vertical barriers 721A and 721B (closed and open configurations respectively) arranged in embedded, concentric rectangles.

Figure 7D:
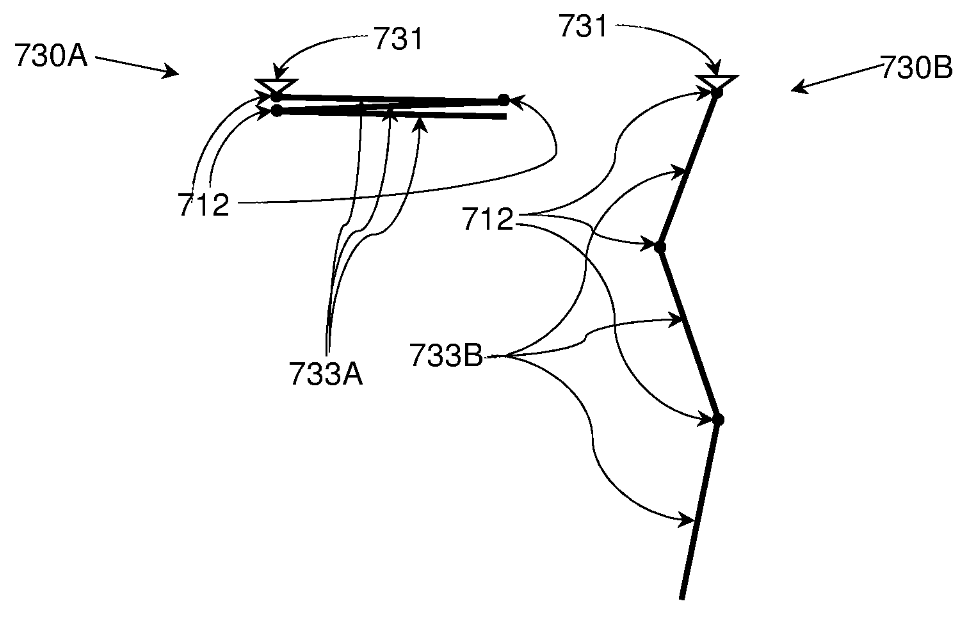
FIG. 7D shows, schematically, an example folding heat barrier for deployment between cells with increased spacing.

Reference is now made to FIG. 7D, which shows, schematically, an example folding heat barrier 730A, 730B for deployment between battery cells with increased spacing. Heat barrier 730A 730B may be used as heat barrier 115, 125, 135, 145, 155, 315, 324, 335, 345, 355, 405, 505, 700A, 700B, 710A, and/or 710B. Folding barrier 730A, 730B may be used as an extending barrier in a closed configuration 703A or in an extended configuration 703B, respectively. Folding barrier 730A, 730B may be used as an extending barrier in a closed configuration 713A or in an extended configuration 713B, respectively. Folding barrier 730A is illustrated in a closed configuration. Folding barrier 730B is illustrated in an extended configuration. Folding barrier 730A, 730B may include hinges 712 and segments 733A (in a closed configuration) and 733B (in an extended configuration). Hinges 712 (e.g., spring loaded hinges or flexible regions) may allow the change from segments 733A in a closed configuration to 733B in an extended configuration. Folding barriers 733A and 733B may include heat insulating layers and heat conducting layers configured to provide anisotropic thermal conductivity allowing the heat to flow out from between neighboring cells. For example, the thermal conductivity in the direction between cells (horizontal) is low (thermal resistance is high) and the thermal conductivity in the direction parallel to the cells is high (thermal resistance is low).

Figure 7E:
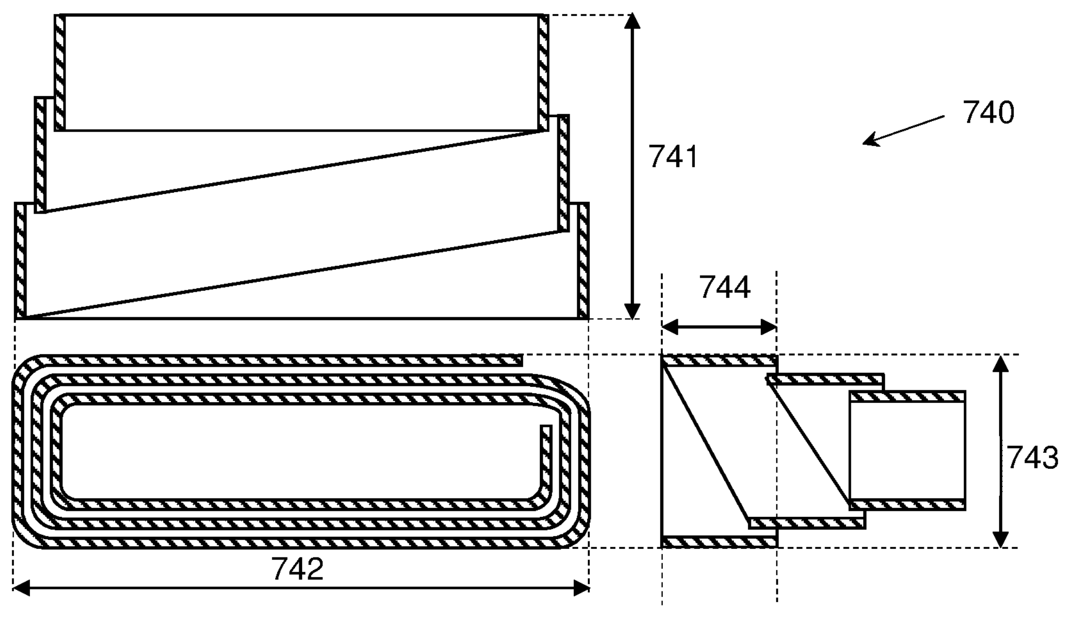
FIG. 7E shows, schematically, an example flat cross-section volute spring for deployment between cells with increased spacing.

Reference is now made to FIG. 7E, which shows, schematically, an example flat cross-section volute spring 740 for deployment between battery cells with increased spacing. FIG. 7E shows volute spring 740 in an open configuration from three sides. Volute spring 740 may be used as heat barrier 115, 125, 135, 145, 155, 315, 324, 335, 345, 355, 405, 505, 700A, 700B, 710A, and/or 710B. Volute spring 740 may be used as an extending barrier in a closed configuration 703A or in an upward extended configuration 703B. Volute spring 740 may be used as an extending barrier in a closed configuration 713A or in a downward extended configuration 713B. Volute spring 740 may comprise a height 741 (in extended configuration), which is substantially equivalent to a cell height, a length 742, which is substantially equivalent to a cell width, and/or a width 743, which is substantially equivalent to the extended spacing between cells. When in the closed configuration, volute spring 740 may have a total height equivalent to the height of one loop 744 of the volute spring 740. Similarly, one or more of heat barrier 115, 125, 135, 145, 155, 315, 324, 335, 345, 355, 405, 505, 700A, 700B, 710A, 710B may comprise a height which is substantially equivalent to a cell height, a length which is substantially equivalent to a cell width, and/or a width which is substantially equivalent to the extended spacing between cells.

Specific dimensions, specific materials, specific ranges, specific resistivities, specific voltages, specific shapes, and/or other specific properties and values disclosed herein are by example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter. For example, the disclosure of a first value and a second value for a given parameter can be interpreted as disclosing that any value between the first and second values could also be employed for the given parameter. For example, if parameter X is exemplified herein to have value A and also exemplified to have value Z, it is envisioned that parameter X may have a range of values from about A to about Z. Similarly, it is envisioned that the disclosure of two or more ranges of values for a parameter (whether such ranges are nested, overlapping, or distinct) subsume all possible combination of ranges for the value that might be claimed using endpoints of the disclosed ranges. For example, if parameter X is exemplified herein to have values in the range of 1-10, and/or 2-9, and/or 3-8, it is also envisioned that Parameter X may have other ranges of values including 1-9, 1-8, 1-3, 1-2, 2-10, 2-8, 2-3, 3-10, and 3-9.

In the description of various illustrative features, reference is made to the accompanying drawings, which form a part hereof, and in which is shown, by way of illustration, various features in which aspects of the disclosure may be practiced. It is to be understood that other features may be utilized and structural and functional modifications may be made, without departing from the scope of the present disclosure.

Terms such as "multiple" as used in this disclosure indicate the property of having and/or involving several parts, elements, and/or members.

It may be noted that various connections are set forth between elements herein. These connections are described in general and, unless specified otherwise, may be direct or indirect; this specification is not intended to be limiting in this respect, and both direct and indirect connections are envisioned. Further, elements of one feature in any of the examples may be combined with elements from other features in any of the examples, in any combinations or sub-combinations.

All described features, and modifications of the described features, are usable in all aspects of the examples taught herein. Furthermore, all of the features, and all of the modifications of the features, of all of the examples described herein, are combinable and interchangeable with one another.

The following clauses are examples of aspects of the technical solutions disclosed herein:

Clause 1. An apparatus comprising:
- a battery pack comprising a front panel;
- a plurality of battery cells located within the battery pack; and
- a spacer mechanism configured to operate in a closed configuration and an open configuration, wherein the spacer mechanism controls distances between each of the plurality of battery cells, including setting a first distance between each of the plurality of battery cells in the closed configuration, and setting a second distance between each of the plurality of battery cells in the open configuration, wherein the first distance is less than the second distance.

Clause 2. The apparatus further comprising:
- a sensor configured to measure a temperature of at least one of the plurality of battery cells; and
- a controller configured to:
  - monitor the temperature values of at least one of the plurality of battery cells using the sensor;
  - subsequent to a first temperature value exceeding a first threshold, open the front panel of the battery pack, and
  - subsequent to a second temperature value exceeding a second threshold, change the spacer mechanism from the closed configuration to the open configuration,
  - wherein the sensor is at least one of: a temperature sensor, a voltage sensor, a pressure sensor, a strain gauge, an acoustic sensor, or a gas sensor.

Clause 3. The apparatus further comprising a communication circuit connected to the controller, wherein the controller is further configured, subsequent to the first temperature value exceeding the first threshold, to send a first notification using the communication circuit.

Clause 4. The apparatus further comprising a communication circuit connected to the controller, wherein the controller is further configured, subsequent to the second temperature value exceeding the second threshold, to send a second notification using the communication circuit.

Clause 5. The apparatus wherein the spacer mechanism comprises a pantograph, and wherein the pantograph is configured to change from the closed configuration to the open configuration.

Clause 6. The apparatus wherein the spacer mechanism comprises a telescopic screw drive, and wherein the telescopic screw drive is configured to change from the closed configuration to the open configuration.

Clause 7. The apparatus wherein the spacer mechanism comprises a motor configured to change the spacer mechanism from the closed configuration to the open configuration when the motor is activated.

Clause 8. The apparatus wherein the spacer mechanism comprises a heat resistant shell and an intumescent material located within the heat resistant shell, and wherein the spacer mechanism is located between two adjacent battery cells of the plurality of battery cells.

Clause 9. The apparatus wherein each pair of adjacent battery cells of the plurality of battery cells comprises an intervening spacer mechanism.

Clause 10. The apparatus further comprising a series of heat barriers configured to extend between each pair of battery cells of the plurality of battery cells when the plurality of battery cells are in the open configuration.

Clause 11. The apparatus wherein the series of heat barriers comprise a heat insulating layer.

Clause 12. The apparatus wherein the series of heat barriers comprise a heat conducting layer.

Clause 13. The apparatus wherein the series of heat barriers is configured to operate in a closed configuration or an open configuration.

Clause 14. The apparatus wherein the series of heat barriers comprise a spring.

Clause 15. The apparatus wherein the series of heat barriers comprise telescoping barriers.

Clause 16. The apparatus wherein the series of heat barriers comprise telescoping springs.

Clause 17. The apparatus wherein the series of heat barriers comprise volute springs.

Clause 18. The apparatus wherein the spacer mechanism comprises a filament, cable or link chain to separate the plurality of battery cells in the open configuration.

Clause 19. A method comprising:

subsequent to a first temperature value of at least one of a plurality of battery cells exceeding a first threshold, opening a front panel of a battery pack comprising the plurality of battery cells; and subsequent to a second temperature value exceeding a second threshold, changing a spacer mechanism from a closed configuration to an open configuration;

wherein the spacer mechanism controls distances between each of the plurality of battery cells, including setting a first distance between each of the plurality of battery cells in the closed configuration, and setting a second distance between each of the plurality of battery cells in the open configuration, wherein the first distance is less than the second distance.

Clause 20. The method further comprising monitoring the temperature of at least one of the plurality of battery cells using a sensor, wherein the sensor is at least one of: a temperature sensor, a voltage sensor, a pressure sensor, a strain gauge, an acoustic sensor, or a gas sensor.

Clause 21. The method further comprising, subsequent to the first temperature value exceeding the first threshold, sending a first notification using a communication circuit.

Clause 22. The method further comprising, subsequent to the second temperature value exceeding the second threshold, sending a second notification using a communication circuit.

Clause 23. The method wherein the spacer mechanism comprises a pantograph, and wherein the pantograph is configured to change from the closed configuration to the open configuration.

Clause 24. The method wherein the spacer mechanism comprises a telescopic screw drive, and wherein the telescopic screw drive is configured to change from the closed configuration to the open configuration.

Clause 25. The method wherein the spacer mechanism comprises a motor configured to change the spacer mechanism from the closed configuration to the open configuration when the motor is activated.

Clause 26. The method wherein the spacer mechanism comprises a heat resistant shell and an intumescent material located within the heat resistant shell, and wherein the spacer mechanism is located between two adjacent battery cells of the plurality of battery cells.

Clause 27. The method wherein each pair of adjacent battery cells of the plurality of battery cells comprises an intervening spacer mechanism.

Clause 28. The method further comprising extending a plurality of heat barriers, wherein one of the plurality of heat barriers is extended between a pair of the plurality of battery cells when the plurality of battery cells are in the open configuration.

The invention claimed is:

1. An apparatus comprising:

a battery pack comprising a front panel;

a plurality of battery cells located within the battery pack;

a spacer mechanism configured to operate in a closed configuration and an open configuration;

a temperature sensor configured to measure a temperature of at least one of the plurality of battery cells; and a controller configured to:

monitor the temperature of at least one of the plurality of battery cells using the temperature sensor;

subsequent to a first temperature value exceeding a first threshold, open the front panel of the battery pack, and subsequent to a second temperature value exceeding a second threshold, change the spacer mechanism from the closed configuration to the open configuration, wherein the spacer mechanism controls distances between each of the plurality of battery cells, including setting a first distance between each of the plurality of battery cells in the closed configuration, and setting a second distance between each of the plurality of battery cells in the open configuration, wherein the first distance is less than the second distance.

2. The apparatus of claim 1, further comprising a communication circuit connected to the controller, wherein the controller is further configured, subsequent to the first temperature value exceeding the first threshold, to send a first notification using the communication circuit.

3. The apparatus of claim 1, further comprising a communication circuit connected to the controller, wherein the controller is further configured, subsequent to the second temperature value exceeding the second threshold, to send a second notification using the communication circuit.

4. The apparatus of claim 1, wherein the spacer mechanism comprises a pantograph, and wherein the pantograph is configured to change from the closed configuration to the open configuration.

5. The apparatus of claim 1, wherein the spacer mechanism comprises a telescopic screw drive, and wherein the telescopic screw drive is configured to change from the closed configuration to the open configuration.

6. The apparatus of claim 1, wherein the spacer mechanism comprises a motor configured to change the spacer mechanism from the closed configuration to the open configuration when the motor is activated.

7. The apparatus of claim 1, wherein each pair of adjacent battery cells of the plurality of battery cells comprises an intervening spacer mechanism.

8. The apparatus of claim 1, further comprising a series of heat barriers configured to extend between each pair of battery cells of the plurality of battery cells when the plurality of battery cells are in the open configuration.

9. The apparatus of claim 8, wherein the series of heat barriers is configured to transition from a closed barrier configuration to an open barrier configuration.

10. The apparatus of claim 8, wherein the series of heat barriers comprise at least one of a heat insulating layer, a heat conducting layer, a spring, a telescoping barrier, a telescoping spring, or a volute spring.

11. The apparatus of claim 1, wherein the spacer mechanism comprises a filament, cable or link chain to separate the plurality of battery cells in the open configuration.

12. A method comprising:

subsequent to a first temperature value of at least one of a plurality of battery cells exceeding a first threshold, opening a front panel of a battery pack comprising the plurality of battery cells; and subsequent to a second temperature value exceeding a second threshold, changing a spacer mechanism from a closed configuration to an open configuration, wherein the spacer mechanism controls distances between each of the plurality of battery cells, including setting a first distance between each of the plurality of battery cells in the closed configuration, and setting a second distance between each of the plurality of battery cells in the open configuration, wherein the first distance is less than the second distance.

13. The method of claim 12, further comprising monitoring temperature of at least one of the plurality of battery cells using a sensor, wherein the sensor is at least one of: a temperature sensor, a voltage sensor, a pressure sensor, a strain gauge, an acoustic sensor, or a gas sensor.

14. The method of claim 12, further comprising, subsequent to the first temperature value exceeding the first threshold, sending a first notification using a communication circuit.

15. The method of claim 12, further comprising, subsequent to the second temperature value exceeding the second threshold, sending a notification using a communication circuit.

16. The method of claim 12, wherein the spacer mechanism comprises at least one of:

a pantograph configured to change from the closed configuration to the open configuration;

a telescopic screw drive configured to change from the closed configuration to the open configuration;

a motor configured to change the spacer mechanism from the closed configuration to the open configuration when the motor is activated; or a heat resistant shell and an intumescent material located within the heat resistant shell, and wherein the spacer mechanism is located between two adjacent battery cells of the plurality of battery cells.

17. The method of claim 12, wherein each pair of adjacent battery cells of the plurality of battery cells comprises an intervening spacer mechanism.

18. The method of claim 12, further comprising extending a plurality of heat barriers, wherein one of the plurality of heat barriers is extended between a pair of the plurality of battery cells when the plurality of battery cells are in the open configuration.

* * * * *